W. & H. W. NOYES.
Improvement in Presses for Moulding Combs.
No. 131,626. Patented Sep. 24, 1872.

UNITED STATES PATENT OFFICE.

WILLIAM NOYES AND HERBERT W. NOYES, OF NEWBURYPORT, MASS.

IMPROVEMENT IN PRESSES FOR MOLDING COMBS.

Specification forming part of Letters Patent No. 131,626, dated September 24, 1872; antedated September 21, 1872.

*To all whom it may concern:*

Be it known that we, WILLIAM NOYES and HERBERT W. NOYES, of Newburyport, in the county of Essex and State of Massachusetts, have invented a certain new and useful Press for Molding Combs, of which the following is a specification:

The Nature of the Invention.

The nature of our invention consists in combining a series of molds in casings in such a manner that the casing shall always hold within it a certain number of the molds—a new mold being inserted at one end of the casing as often as a mold passes out of the other end. By this arrangement a mold remains for a considerable time under pressure in the case—that is, sufficiently long to get quite cool. To quicken the cooling process the parts of which the casing is formed are made hollow and filled with flowing water.

Description of the Accompanying Drawing.

Figure 1:
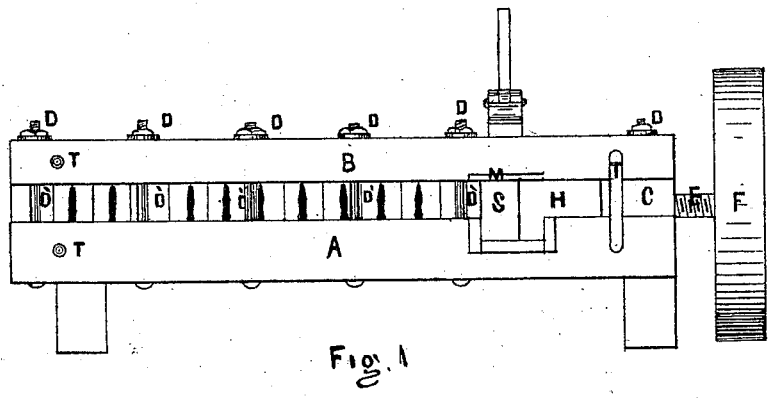
Figure 2:
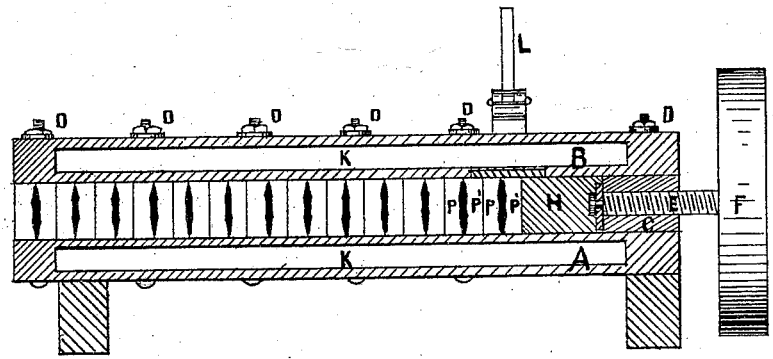
Figures 3, 4:
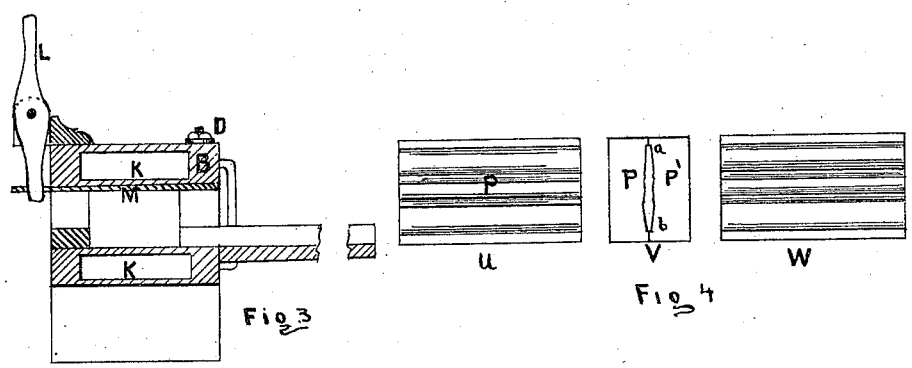

Figure 1 is an elevation of our improved press. Fig. 2 is a vertical section of the same. Fig. 3 is a cross vertical section of the same. Fig. 4 shows one of the molds in detail.

General Description.

A and B, Figs. 1, 2, and 3, represent the upper and lower parts of the body of our press, and may be called the casing. These are made hollow, as shown in Figs. 2 and 3, and are supplied with water through the pipes T T. The two parts A and B of the case are held together by screw-bolts D D', Figs. 1 and 2. The end of the case to which the press-screw E is attached, has a head-block, C, through which the press-screw E passes. The head-block C is made of the same width as the molds. The other end of the casing is contracted by the screws D D', so that the molds are held by considerable friction. The amount of friction may be regulated by the screws D D', so that the molds may offer any desired amount of resistance to the pressure of the screw E, thus causing the desired pressure to be brought to bear on the molds. One of the molds P P' is shown at Fig. 4. V, Fig. 4, shows a section of the mold—the shape of the blank being represented by *a b*. At U and W are shown the inner side of the parts P and P' of the mold. The matrix of the mold will, of course, be varied to suit the different kinds of combs. M, Figs. 1 and 3, is an incline slide or wedge, actuated by the lever L—its use being to hold the last mold that is put into the press until the screw E has pressed it forward and further along in the press, where the friction of the parts A and B will hold it.

To use my press I proceed as follows: The incline or wedge M is pushed forward so as to open the space S wide enough to receive the mold P P'. One set of the molds are heated to a temperature of about 350° Farenheit, the comb-blank inserted between them, and the whole placed in the space S. Now the incline M is drawn back so as to press the mold downward and into the proper position for entering that part of the case that exerts friction upon the molds. The press-screw E is now turned so as to bring the follower H to bear against the mold, which action is continued until the mold is forwarded into the case. The follower is now withdrawn and the same operation repeated with another mold.

From the above it will be seen that the molds will pass out at the end of the press as fast as they are put in at the mouth; but as there is always a number in the press it is evident that each mold must stay in the press for a considerable time, and as the press has a current of cold water flowing through it the mold will be cooled before leaving it.

The advantages of our press are, that we may pass a great many through it in an hour and yet have each mold in the press long enough to get cool before it leaves. Also, as we keep the press cold with water the molds may be very hot when first inserted, since the water will cool them so rapidly as to prevent injury by heat.

We claim as our invention—

1. The casing A B, in combination with the follower H and molds P P', all arranged to operate as described, and for the purpose set forth.

2. The casing A B, when the same is provided with water-chambers K K, substantially as described, and for the purpose set forth.

3. The combination of the lever L, wedge M, and press A B, substantially as described, and for the purpose set forth.

WILLIAM NOYES.
HERBERT W. NOYES.

Signed in presence of—
ELIPHALET GRIFFIN,
NATHL. PIERCE.